United States Patent [19]
Potu et al.

[11] Patent Number: 5,812,144
[45] Date of Patent: Sep. 22, 1998

[54] SYSTEM FOR PERFORMING REAL-TIME VIDEO RESIZING IN A DATA PROCESSING SYSTEM HAVING MULTIMEDIA CAPABILITY

[75] Inventors: Brahmaji Potu; Kevin Lynn Hill, both of Austin, Tex.

[73] Assignee: International Business Machines Corporation, Armonk, N.Y.

[21] Appl. No.: 525,862

[22] Filed: Sep. 8, 1995

[51] Int. Cl.$^6$ .................................................. G06T 3/40
[52] U.S. Cl. ........................................ 345/439; 345/213
[58] Field of Search ................................. 395/501, 507, 395/509, 523, 139, 131; 345/127–131, 153–155, 185, 186, 189, 202, 213; 382/232, 298; 348/441, 581; 358/451, 448

[56] References Cited

U.S. PATENT DOCUMENTS

| | | | |
|---|---|---|---|
| 5,119,082 | 6/1992 | Lumelsky et al. | 345/132 |
| 5,227,863 | 7/1993 | Bilbrey et al. | 348/578 |
| 5,237,432 | 8/1993 | Calarco et al. | 358/451 |
| 5,319,793 | 6/1994 | Hancock et al. | 395/125 |
| 5,335,321 | 8/1994 | Harney et al. | 395/503 |
| 5,384,904 | 1/1995 | Sprague et al. | 395/139 |
| 5,412,766 | 5/1995 | Pietras et al. | 395/131 |
| 5,517,612 | 5/1996 | Dwin et al. | 395/501 |
| 5,574,572 | 11/1996 | Malinowski et al. | 382/298 |

*Primary Examiner*—Kee M. Tung
*Attorney, Agent, or Firm*—Volel Emile; Alan L. Carlson; Andrew J. Dillon

[57] ABSTRACT

A video adapter for use in multimedia computer data processing system is disclosed. The video adapter is able to perform real time video resizing, such as video downscaling and upscaling, during compression and decompression playback within the multimedia computer data processing system. The data processing system typically includes a central processing unit, an input/output bus, and a memory controller for controlling a system memory and a level 2 cache for sending or storing data from the video adapter. The video adapter includes a bus enable logic, coupled to both the video decoder, video encoder, and field memory, that performs the video upscaling and downscaling. The bus enable logic also allows a video pass-through to allow compression and decompression of full resolution images without the need for upscaling or downscaling. The bus enable logic includes a clocked buffer, coupled to a U clock signal, a first enable gate, coupled in parallel to the clock buffer for passing either a U or V component of the digital video signal, and a second enable gate, coupled to a Y component of the digital video signal. The second enable gate is enabled by a Y enable signal and the bus enable log operates such that the Y component is active for two consecutive clock cycles and the U and V components alternate for the next two consecutive clock cycles such that in a given cycle period, two Y components are passed while one U and one V component are passed.

16 Claims, 3 Drawing Sheets

SYSTEM FOR PERFORMING REAL-TIME VIDEO RESIZING IN A DATA PROCESSING SYSTEM HAVING MULTIMEDIA CAPABILITY

BACKGROUND OF THE INVENTION

1. Technical Field

The present invention relates generally to video signal processing and, more particularly, to data processing systems providing digital signal of video and graphics information. More particularly still, the present invention relates to real-time scaling of video or graphics information displayable and for storage on a data processing system having multimedia capability.

2. Description of the Related Art

In the video signal processing art, there is usually a single central processing unit that has a control over a bus that couples all other components attached to the central processing unit. As a result, the transactions that can take place are very restricted because there is only one processing unit performing the applications as well as controlling the graphics subsystem. This works well only for low resolution graphics applications. There are add-on cards that allow some acceleration in the graphics control chip. This improvements saves bandwidth and allowing off-loading of some high level commands to the graphics subsystem. For example, the central processing unit may send commands to draw a line or to draw a rectangle and merely provide coordinates to the graphics subsystem. This permits acceleration of the process compared with sending pixel by pixel information. At low resolution graphics, this approach worked well enough. At higher resolution applications, however, the central processing unit may still be overwhelmed. Thus, as graphics resolutions increased, it was possible to add acceleration in order to accelerate some of the graphics operation, but it eventually reached a point where the actual bus bandwidth of a typical bus in a computer system could not be sustained or could not sustain the very high update rate of graphics images. This is further complicated when video is added because video must be updated at thirty frames a second, and may even require 5 to 9 megabytes per second sustained bandwidth across a bus into the graphics subsystem.

The goal of attaining an integrated video-graphics system requires system market texture that balances the often conflicting requirements video subsystems and graphic subsystems. For example, while increasing horizontal and vertical resolution is useful to graphics images, in digital video subsystems increasing horizontal and vertical resolution is very expensive and may not perceivably change the image quality. Likewise, in graphics subsystems, the pixel depth, the number of simultaneous colors available, is as important, it is not for video systems. While 16 bit near true color pixels are adequate for a video system, a graphics system may advantageously make use of 24 bit pixels.

Moreover, to achieve real-time video typically requires video resizing, especially in multimedia applications. Real-time video requires the downscaling of video to achieve bandwidth reduction and to be compatible with various video compression algorithms typically used for video storage or transmission. Video decompression then requires upscaling or zooming of the video while displaying for better viewing. Decimation by pixel dropping is one method of performing video downscaling while interpolation by pixel replication is one method of performing upscaling.

A typical video capture and playback adapter consists of a video coder that converts and decodes an NTSC/PAL analog video signal into its digital components of Y, U, and V. After the signal is converted to its digital components, downscaling is performed since the input/output bus cannot keep up with real-time video data rates. Next, a video compression/decompression (CODEC) stage reduces the bandwidth of the input data by a lossy compression algorithm and then stores it in a buffer. After the compression has been performed, a bus interface device sends the compressed data to either a system memory for storage or to a local area network (LAN) adapter for transmission. Next, video data is sent on a YUV bus from the system memory to either a graphics adapter or a video encoder for monitoring. During playback of the compressed video data, the data is read into the buffer from system memory by the bus interface device. It is then decompressed by the video codec into the field memory. The decompressed data on the YUV bus can then be viewed on a display or NTSC monitor. Since the data has been downscaled and compressed, the data must be upscaled on the YUV bus since the decompressed images are one-fourth or one-eighth of full size and need to be scaled up or zoomed for a display.

A full sized image frame corresponds to a square pixel resolution of 640×480 for a national television system committee (NTSC) signal and 768×576 for a phase alternation line (PAL) or sequential colour avec memoire or sequential color with memory (SECAM) signal. Many multimedia systems use JPEG format, which is an international standards organization (ISO) standard for still image compression, as the video codec to reduce the bandwidth of input video data. The JPEG engine is also used for decompression during playback of the compressed video data. This adapter is supported under many multimedia adapters, specifically under one known as Ultimedia Services/6000 (UMS/6000), manufactured by International Business Machines Incorporated. Compressing a full size image with JPEG maintains good image quality, but produces a large digital imaging data rate. For example, a full-time data rate is difficult to handle over tradition I/O bus or over a LAN. Hence, it is required to reduce the data rate at the source itself. Resizing the full resolution square-pixel video image to common intermediate format (CIF) size (320×240 for NTSC, 384×288 for PAL or SECAM) and compressing only the odd or even fields reduces the data rate to 150 KBytes/per second. Moreover, the UMS/6000 handles CIF size images seamlessly and a number of video compression standards like MPEG, Px 64 requires CIF size input. During playback, the decompressed CIF size image can be scaled up to full screen resolution for better viewing.

To provide the upscaling and downscaling capability within the multimedia platform described above, a scaler chip is typically inserted after the video decoding circuitry. The scaler chips typically are costly, being even more expensive depending upon the flexibility, meaning continuous scaling, and its functionality. Unfortunately, data processing systems having full size video imaging are expensive, partly because of the cost of the extra scaler chip.

Accordingly, what is needed is a system that is able to provide video downscaling and upscaling during compression and decompression playback without the need for additional circuitry such as a scaling chip, buffers, and other associated interface logic required to add a scaling chip, to a video imaging unit of the data processing system.

SUMMARY OF THE INVENTION

It is therefore one object of the present invention to provide video signal processing.

It is another object of the present invention to provide digital signals of video and graphics information.

It is yet another object of the present invention to provide real-time scaling of video or graphics information displayable and for storage on a data processing system having multimedia capability.

The foregoing objects are achieved as is now described. According to the present invention, a video adapter for use in multimedia computer data processing system is disclosed. The video adapter is able to perform real time video resizing, such as video downscaling and upscaling, during compression and decompression playback within the multimedia computer data processing system. The video adapter selectively clocks individual video signal components in a predetermined sequence to accomplish the resizing.

The data processing system typically includes a central processing unit, an input/output bus, and a memory controller for controlling a system memory and a level 2 cache for sending or storing data from the video adapter. The video adapter further comprises a video signal input and a video decoder, coupled to the input, for converting and decoding an analog video signal into a digital signal. The digital signal comprises digital components Y, U, and V. Further, the video adapter includes a video encoder, coupled to the video decoder, for converting and encoding the Y, U, and V digital components into an analog video signal for display on a video monitor, which completes the multimedia data processing system. A field memory is also provided in the video adapter and is coupled to the video decoder so that it can provide write and read operations and aid in the upscale and downscale functions performed by the video adapter.

The video adapter also includes a bus enable logic, coupled to both the video decoder, video encoder, and field memory, and it is this element of the video adapter that performs the video upscaling and downscaling while also including a video pass-through feature to allow compression and decompression of full resolution images without the need for upscaling or downscaling. The bus enable logic includes a clocked buffer, coupled to a U clock signal, a first enable gate, coupled in parallel to the clock buffer for passing either a U or V component of the digital video signal, and a second enable gate, coupled to a Y component of the digital video signal. The second enable gate is enabled by a Y enable signal and the bus enable logic operates such that the Y component is active for two consecutive clock cycles and the U and V components alternate for the next two consecutive clock cycles such that in a given cycle period, two Y components are passed while one U and one V component are passed. A video compression/decompression or codec element is also provided for providing compression and decompression on the digital signal.

The invention performs real time digital video resizing, such as video pixel format upscaling and downscaling. The scaler either downsizes full resolution image into CIF size or upscales the CIF size image to full resolution image for various multimedia applications. The adapter also has a pass-through mode to let full resolution images compress during capture and decompress during playback. The downscaling is performed by destination with pixel clock manipulation before storing into the field memories for video compression and capture. The upscaling is performed with pixel replication using master timing signals from video decoder and synchronized readout from the field memories. This provides for a synchronized tear-free playback on a TV monitor computer display while the scaling and synchronization functions are performed on the fly without needing an additional scaler chip or buffers or interface logic.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
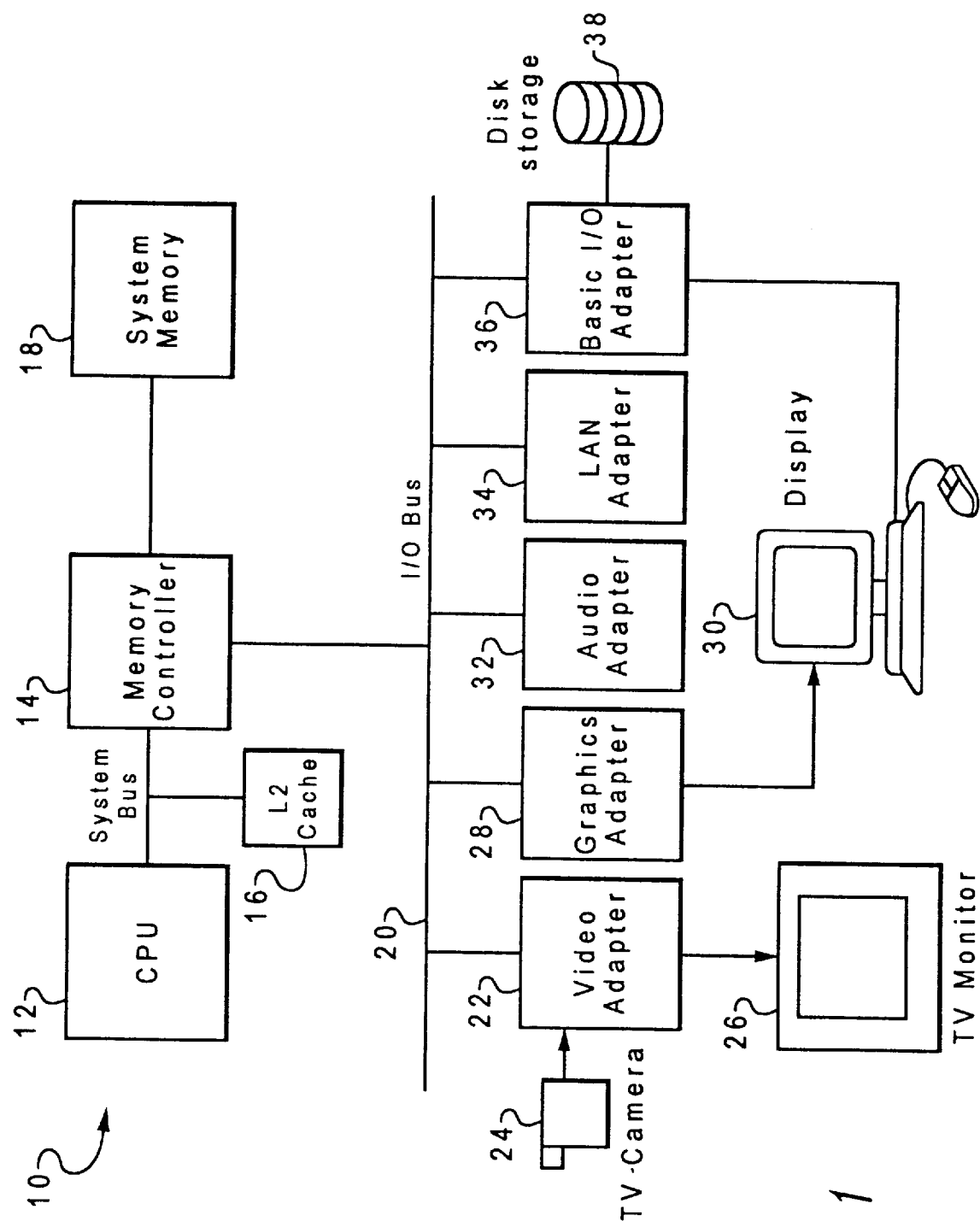
FIG. 1 depicts in accordance with a preferred embodiment of the present invention is a block diagram of a data processing system having a video capture and playback system.

FIG. 1 is a block diagram of a data processing system 10 having a video capture and playback system. Data processing system 10 further includes a central processing unit (CPU) 12, which is further coupled to a memory controller 14 via a system bus. Further coupled to both memory controller 14 and CPU 12 is a level 2 cache system 16. Memory controller 14 controls the functionality and operation of cache 16 as well as system memory 18. Memory controller couples the CPU and memory system to the rest of the components via I/O bus 20, which may be, for example, a PCI, Micro Channel, ISA, or other type bus system compatible with a personal computer or workstation environment.

The video capture and playback system consist of video adapter 22, TV camera 24, and TV monitor 26. Imaging information is recorded via TV camera 24 and processed in video adapter 22 for later display on TV monitor 26. Additionally, video information may come for system memory 18 or any other type of user input so desired. Data processing system 10 further comprises a graphics adapter 28, coupled to I/O bus 20 and further coupled to a display 30. An audio adapter 32 if further coupled to the I/O bus 20 as well as a LAN adapter 34 and basic input output (I/O) adapter 36, which may be further connected to a disk storage unit 38 for long term storage of data information and also which may temporarily store information used by video adapter 22. Basic I/O adapter 36 provides user input and responses to the user from the data processing system 10. Video adapter 22 is depicted in greater detail in the block diagram of FIG. 2.

Figure 2:
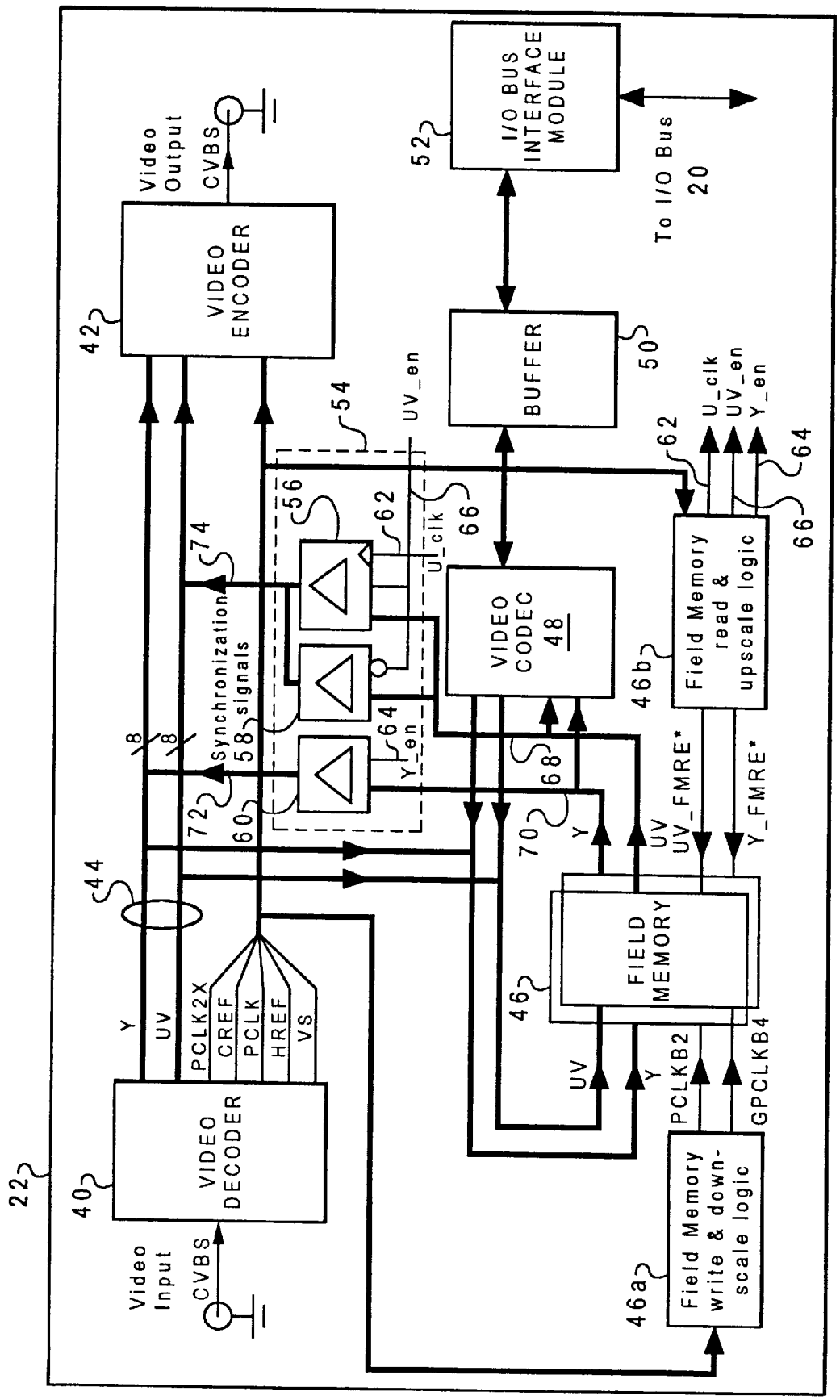
FIG. 2 is a block diagram depicting a video adapter in greater detail as well as also illustrating data flow amongst the elements within a video adapter.

FIG. 2 is a block diagram depicting video adapter 22 in greater detail as well as also illustrating data flow amongst the elements within video adapter 22. Video capture and playback adapter 22 further includes a video decoder 40, which converts and decodes an NTSC/PAL analog video signal into its digital components Y, U, and V, and is further coupled to a video encoder 42 via YUV bus 44. Video encoder 42 converts and encodes digital components Y, U, and V into an NTSC/PAL analog video signal for display on a TV monitor. Video decoder 40 is further coupled to field memory 46 via YUV bus 44. Synchronization signals from video decoder 40 are also forwarded to field memory 46 through either field memory write and downscale logic 46A or field memory read and upscale logic 46B. These synchronization signals are further depicted in the various timing diagrams of FIGS. 3–5 and will be explained in greater detail in those particular figures.

Field memory 46 then couples to video codec 48, which provides for compression or decompression that reduces the bandwidth of input data by a lossy algorithm and then stores the data in buffer 50. Buffer 50 is further connected to an I/O bus interface module 52 that sends the compressed data to either system memory 18 or to a LAN adapter 34 for transmission. The video data on YUV bus 44 may also be sent out to graphics adapter 28 for monitoring.

During playback of decompressed video data with video adapter 22, the data is read into buffer 50 from system memory 18 by the bus interface module 52. It is then decompressed by video codec 48 into field memory 46. The decompressed data on YUV bus 44 can be viewed on a display or TV monitor 26. Since the decompressed images are merely one-fourth or one-eighth of full size, means are provided for scaling up or zooming the decompressed image for display, which connects to the YUV bus 44.

The upscaling means is performed with bus enable logic 54 coupled to YUV bus 44. Bus enable logic 54 includes a clocked buffer 56 and two enable gates 58 and 60. Clocked buffer 56 receives U_clk clock signal 62. Y-component gate 60 is always enabled by Y_en signal 64 while the U or V component data are attached to YUV bus 44 through clocked buffer 56 and gate 58 in parallel, with only one of them being enabled with UV_en signal 66 at every pixel clock signal (PCLK). Y-component gate 60 receives its data from a field memory 44 via 8-bit bus 70 and the output of gate 60 returns to YUV bus 44 by 8-bit video output 72. UV component data is received from field memory 46 via 8-bit bus 68 and the outputs of clocked buffer 56 and gate 58 return to YUV bus 44 by 8-bit video output 74.

Video adapter 22, in this implementation, also provides a pass-through mode for putting out digital video data into field memory 46 without downsizing and read out the data from field memory 46 without upscaling. This mode enables compression and decompression of full resolution images. The actual operation of resizing logic is described in greater detail below. What video adapter 22 provides is the ability to perform on-the-fly resizing with pixel clock manipulation of time-interleaved digital video component YUV data without requiring a separate scaling chip, additional buffers, or associated interface logic. This allows the data processing system to perform full size video downscaling to CIF size during compression and upscaling the video from CIF size to full size during playback.

Figure 3:
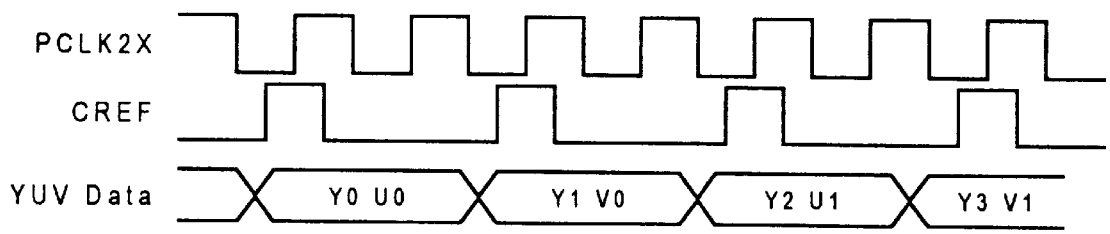
FIG. 3 depicts a clock diagram of a video decoder output data timing function.

The output of video decoder 40 is in YUV 4:2:2 pixel format. Video decoder 40 also produces the timing signals associated with time-interleaved U and V components for buffer 50 and tri-statable gates 58, 60. An 8-bit Y data and an 8-bit U or V data are produced at every pixel clock (PCLK). Thus, the 16-bit data output sequence for a line is Y0 U0, Y1 V0, Y2 U1, Y3 V1, . . . etc., as shown in the clock timing diagram of FIG. 3. FIG. 3 is a clock diagram of a video decoder output data timing function. In FIG. 2, double pixel clock frequency is PCLK2X while pixel data qualifier signal is CREF.

Figure 4:
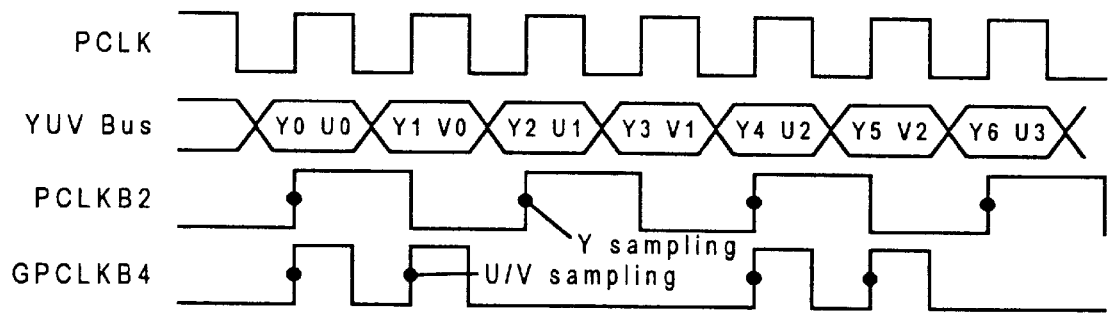
FIG. 4 represents a timing diagram showing video data sampling for downscaling.

FIG. 4 represents a timing diagram showing video data sampling for downscaling. Before downscaling can be adequately understood, a brief description of a 16-bit pixel stream is provided. The 16-bit pixel stream in a line is in the sequence Y0 U0, Y1 V0, Y2 U1, Y3 V1, Y4 U2, Y5 V2 . Importantly, the number of U and V components are half of Y components output in YUV 4:2:2 format per line. A full size NTSC image has a square pixel resolution of 640 pixels per line by 480 lines per frame. As the TV source is interlaced, two fields of resolution, 640 pixels/line X 240 lines/field each are generated. A CIF size image has the same vertical resolution or number of lines as a field, but has only half of the resolution in horizontal direction, or number of pixels. Hence, the pixel sequence after downscaling by simple decimation is shown as follows:

Y0 U0, Y2 V0, Y4 U2, Y6 V2, . . .

This sequence can be generated by sampling the Y data at the half pixel clock frequency (PCLKB2) and sampling the UV data with PCLK gate by one-fourth the pixel clock frequency (PCLKB4). The downscaled Y and UV data are stored in field memory. The YUV data sampling for downscaling with PCLK and gated PCLKB4 (GPCLKB4) is shown in FIG. 4. The Y sampling occurs at each up phase of PCLKB2 clock cycle while the U and V sampling occurs at the positive phase of each GPCLKB4 clock cycle, producing the required pixel sequence.

Figure 5:
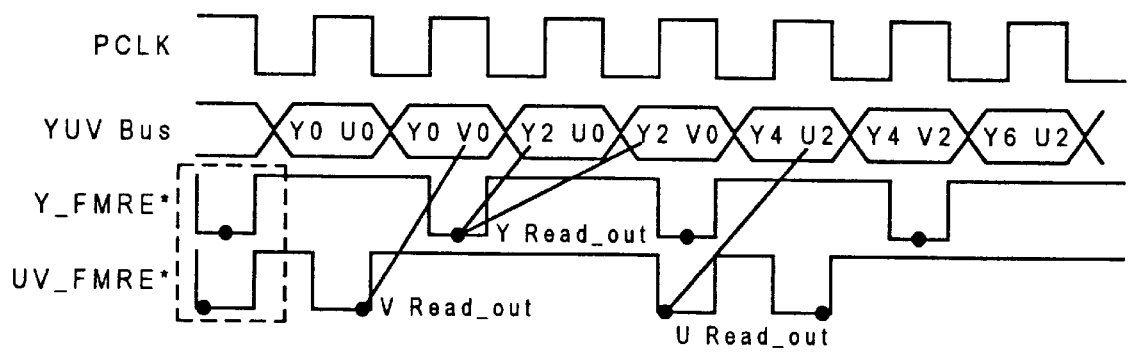
FIG. 5 depicts the synchronization logic involving field memory read out timing with respect to encoder timing.

Performing full resolution video upsizing from a CIF sized image will now be described in relation to the timing diagram of FIG. 5. The process of upscaling from CIF size to full size resolution video is more complex than merely changing the sampling times for the components Y, U, and V as done in the downscaling portion of the present invention. During playback, the decompressed CIF pixel size sequence in the field memory for a line is as follows:

Y0 U0, Y2 V0, Y4 U2, Y6 V2, . . .

The upscaled full size video pixel sequence on the YUV bus after on-the-fly resizing logic is as follows:

Y0 U0, Y0 V0, Y2 U0, Y2 V0, Y4 U2, Y4 V2, Y6 U2, Y6 V2 . .

Moreover, this output sequence is also synchronized with the video encoder pixel timing so that no tearing artifacts appear on the display after encoding the digital components into a NTSC/PAL signal. Tearing artifacts occur when partial fields from different frames are displayed in a single frame time. The synchronization logic involves field memory read out timing with respect to encoder timing as shown in FIG. 5. Y component pixels are read out of the field memory with Y_FMRE* signal to the Y field memory. U and V components of pixels are read out with UV_FMRE* signal to UV field memory. The first read out pulse for a line cannot be generated with pixel clock timings as Y0 and U0 have to be available before active video starts. Hence, two separate pulses, which are shown in the dotted box of FIG. 5, just prior to the active video, are generated and combined with regular FMRE* signals. FMRE* signals are generated from PCLK, PCLKB2, and PCLKB4 signals.

The upscaling is also performed with bus enable logic 54 of FIG. 2 on the YUV bus 44 for playback. As earlier described, bus enable logic 54 includes a clock buffer 56 and two enable gates 58 and 60. The Y component gate 60 is always enabled on line 64 and the U or V component data line 68 is attached to bus 44 through buffer 56 and gate 58 in parallel. Buffer 56 and gate 58 gate are alternately enabled every PCLK. When signal U0 is read out, it is stored in buffer 56 and is also enabled onto the bus through the buffer as illustrated in the timing diagram of FIG. 5. When V0 is read out, buffer 56 is disabled and the gate 58 is enabled to put V0 on bus 44.

No readouts from UV field memory read logic 46b are performed for the next two consecutive pixel clock cycles; however, buffer 56 is enabled and gate 58 is disabled to put out U0 again in the first cycle. Next, the buffer is disabled and the gate is enabled thus putting V0 that was readout from field memory read logic 46b again. The sequence is repeated within a line and for every line, thereby producing a full resolution image.

The resizing logic also has a pass-through mode for putting out digital video data into field memory without downsizing and reading out the data from field memory without upscaling. This mode enables compression and decompression of full-resolution images.

In summary, the present invention discloses a real-time digital video resizing method and system that is able to perform video pixel format upscaling and downscaling. The scaler either down sizes full resolution image into CIF size or upscales the CIF size image to full resolution image for various multimedia applications, one of which is for Ultimedia Video I/O Adapters as manufactured and supplied by International Business Machines Incorporated. It also has a pass-through mode to let the full-resolution images compress during capture and decompress during playback. The downscaling is performed by decimation with pixel clock manipulation before storing into the field memories for video compression and capture. The upscaling is performed with pixel replication using master timing signals from video decoder and synchronized read out from the field memories. The synchronized playback is tear-free on a TV monitor or computer display. The scaling and synchronization functions are performed on-the-fly without involving the need for a costly scaler chip, additional buffering, or an interface logic means.

Performing scaling in native video pixel format reduces the amount of data compared to standard RGB pixel scaling typically used in current state of the art digital video systems. On-the-fly resizing logic may be used by all graphics adapters for upscaling data as it is read out from a frame buffer or can be integrated on a digital analog conversion (DAC) chip, which are typically designed to support YUV to RGB color space conversion.

While the invention has been particularly shown and described with reference to a preferred embodiment, it will be understood by those skilled in the art that various changes in form and detail may be made therein without departing from the spirit and scope of the invention.

We claim:

1. A multimedia computer data processing system comprising:
    a central processing unit;
    an input/output (I/O) bus, coupled to said central processing unit;
    a video decoder and a video encoder coupled to said I/O bus, said video encoder and said video decoder for performing video upscaling and video downscaling on a digital video signal;
    a clocked buffer, coupled to a U clock signal;
    a first enable gate, coupled in parallel to said clocked buffer for passing either a U or a V component of said digital video signal; and
    a second enable gate, for passing a Y component of said digital video signal, wherein said Y component is active for two consecutive clock cycles and said U and said V components alternate for the next two consecutive clock cycles.

2. The system of claim 1 wherein said video downscaling and upscaling are achieved during compression or decompression playback.

3. The system of claim 1 wherein said multimedia computer data processing system further comprises:
    a video signal input coupled to said video decoder, said video signal input for receiving an analog video signal; and
    said video decoder for converting and decoding said analog video signal into said digital video signal components.

4. The system of claim 1 wherein said video encoder is coupled to said video decoder, and wherein said video encoder converts and encodes digital video signal components into an analog video signal for display on a video monitor.

5. The system of claim 1 further comprising:
    a field memory, coupled to said video decoder, said field memory for performing write and read and upscale and downscale functions on a desired signal.

6. The system of claim 1 wherein said video decoder and said field memory are synchronized together by synchronization signals from said video decoder.

7. The system of claim 1 further comprising:
    a video codec, coupled to said field memory, wherein said codec is for performing compression or decompression on said desired signal.

8. The system of claim 1 wherein said first enable gate and second enable gate further performs video pass-through to allow compression and decompression of full resolution images.

9. A video adapter for use in a multimedia computer data processing system, said video adapter comprising:
    a video signal input;
    a video decoder, coupled to said video signal input, said video decoder for converting an analog video signal received from said video signal input into a digital signal;
    a clocked buffer coupled to a U clock signal;
    a first enable gate, coupled in parallel to said clocked buffer for passing either a U or V component of a digital video signal; and
    a second enable gate, for passing a Y component of said digital video signal, wherein said Y component is active for two consecutive clock cycles and said U and V components alternate for the next two consecutive clock cycles, such that real-time upscaling and downscaling is achieved by clocking said components during compression and decompression playback utilizing said first enable gate and said second enable gate.

10. The invention of claim 9 further comprising:
    a video encoder, coupled to said video decoder, for converting and encoding digital components into an analog video signal for display on a video monitor.

11. The invention of claim 9 further comprising:
    a field memory, coupled to said video decoder, for performing write and read and upscale and downscale functions on a desired signal.

12. The invention of claim 9 wherein said video decoder and said field memory are synchronized together by synchronization signals from said video decoder.

13. The invention of claim 9 further comprising:
    a video codec, coupled to said field memory, said video codec for performing compression or decompression on a desired signal.

14. The invention of claim 9 wherein said clocked buffer, said first enable gate and said second enable gate further perform video pass-through to allow compression and decompression of full resolution images.

15. The invention of claim 9 wherein said upscaling is performed with pixel replication using master timing signals from said video decoder and synchronized read out from a field memory coupled to said video decoder, said clocked buffer, said first enable gate and said second enable gate.

16. The invention of claim 9 wherein said downscaling is performed by decimation with pixel clock manipulation.

* * * * *